United States Patent [19]

Mikami et al.

[11] 4,302,473
[45] Nov. 24, 1981

[54] PROCESS FOR MANUFACTURING SOYBEAN PROTEINS

[75] Inventors: Yasuo Mikami, Yokohama; Hiroshi Kanda, Zushi; Akio Uno, Yokohama, all of Japan

[73] Assignee: The Nisshin Oil Mills, Ltd., Japan

[21] Appl. No.: 151,708

[22] Filed: May 20, 1980

[30] Foreign Application Priority Data

May 25, 1979 [JP] Japan ................................. 54-64059

[51] Int. Cl.³ .............................................. A23J 3/00
[52] U.S. Cl. ...................................... 426/46; 426/656
[58] Field of Search ........................... 426/44, 46, 656

[56] References Cited

U.S. PATENT DOCUMENTS

| | | | |
|---|---|---|---|
| 2,502,482 | 4/1950 | Sair et al. | 426/46 |
| 2,802,738 | 8/1957 | Anson et al. | 426/46 |
| 3,682,646 | 8/1972 | De Paolis | 426/46 |
| 3,897,570 | 7/1975 | Yokotsuka et al. | 426/46 |
| 4,091,118 | 5/1978 | Rham | 426/46 |
| 4,100,024 | 7/1978 | Nissen | 426/46 X |

Primary Examiner—Robert A. Yoncoskie
Attorney, Agent, or Firm—Bacon & Thomas

[57] ABSTRACT

Soybean proteins are manufactured from soybean protein concentrates. The soybean protein concentrates may be prepared by washing defatted soybean with an alcoholic aqueous solution. The soybean protein concentrates are dispersed in water and then adjusted to a neutral to slightly alkaline pH range or dispersed in an aqueous solution which was previously adjusted with ammonia to be in an alkaline pH range, thus providing a neutral to slightly alkaline aqueous dispersion. The afore-mentioned soybean proteins in this aqueous dispersion are solubilized by the action of a neutral protease. The insolubles in the aqueous dispersion thus prepared are then removed to produce an aqueous solution containing solubilized proteins from which solid proteins are recovered.

12 Claims, No Drawings

PROCESS FOR MANUFACTURING SOYBEAN PROTEINS

BACKGROUND OF THE INVENTION

1. Field of the Invention

The present invention relates to a process for manufacturing soybean proteins and, more particularly, to a process for manufacturing soybean proteins particularly suitable as edible proteins.

2. Description of the Prior Art

Heretofore, processes have been known for manufacturing soybean proteins, for producing soybean protein concentrates by removing saccharides by washing defatted soybean with an acid or by extracting defatted soybean with water, and for manufacturing isolated soybean proteins by a combination of the acid washing and the water extraction. The soybean proteins produced by these processes, however, all smell like raw soybean and have an unfavorable color tone so that they are not suitable as edible proteins.

When defatted soybean is washed with an organic solvent such as alcohol, soybean protein concentrates which have excellent flavor and color tone are obtained. Accordingly, if proteins alone can be extracted and separated from such soybean protein concentrates, soybean proteins which have desirable flavor and color tone and a high solubility would be produced. In order to sufficiently remove saccharides, pigment ingredients and odor causing ingredients, however, washing with hydrated alcohol containing some water is required. Washing with such an organic solvent may denature the soybean proteins and render them so insoluble that further extraction and separation become impossible. Proteins which are only slightly soluble in water may provide only limited utilization as food. Furthermore, water-insoluble fibrous portions derived from soybean may remain intact in proteinous products, giving them a rough texture, so that they are not desired as edible proteins.

SUMMARY OF THE INVENTION

An object of the present invention is to provide a process for manufacturing soybean proteins which have excellent flavor and color tone and have a high solubility.

Another object of the present invention is to provide a process for extracting and separating soybean proteins from alcohol-denatured soybean protein concentrates containing proteins which have excellent flavor and color tone, but which are insoluble in water.

The present invention is directed to a process for manufacturing soybean proteins from soybean protein concentrates. The afore-mentioned soybean protein concentrates may be prepared by washing defatted soybean with an alcoholic aqueous solution. The soybean protein concentrates are dispersed in water and then adjusted with ammonia to a neutral to slightly akaline pH range or dispersed in an aqueous solution which was previously adjusted with ammonia to be in an alkaline pH range, providing a neutral to slightly alkaline aqueous dispersion. The afore-mentioned soybean proteins in this aqueous dispersion are solubilized by the action of a neutral protease. The insolubles in the aqueous dispersion thus prepared are then removed to produce an aqueous solution containing solubilized proteins from which solid proteins are recovered. The recovered soybean proteins have excellent flavor and color tone and retain a high solubility in water.

DETAILED DESCRIPTION OF THE PREFERRED EMBODIMENTS

Raw materials to be employed for the present invention are alcohol-denatured soybean protein concentrates. Defatted soybean which provides suitable raw material concentrates may be obtained by oil extraction through compression of the soybean. Defatted soybean which has not undergone too much thermal denaturation is particularly suitable. The defatted soybean is washed with an alcoholic aqueous solution to provide alcohol-denatured soybean protein concentrates. The concentration of alcohol in the alcoholic aqueous solution, the ratio of the concentrates to the alcoholic aqueous solution, and the washing temperatures may be conveniently chosen depending upon the desired qualities of the product, such as protein purity, flavor and color tone. As the alcohol methanol, ethanol and propanol can be used, but ethanol is most preferred.

The alcoholic aqueous solution usually contains an alcohol in an amount between 40 percent by weight and 95 percent by weight, and a middle concentration solution containing an alcohol in an amount between 50 and 80 percent by weight provides a high degree of refinement of the defatted soybean and improved flavor and color tone. The middle concentration solution, however, tends to increase the insolubility of the proteins.

The solvent ratio of the alcoholic aqueous solution to the defatted soybean to be used for washing the defatted soybean is not critical, and the larger the solvent ratio of alcoholic aqueous solution the better the purification. The optimum solvent ratio may be chosen from manufacturing and economic considerations. Preferably, the alcoholic aqueous solution is employed in an amount of 5 to 20 times the weight of the defatted soybean.

The temperature of washing may be chosen depending upon the desired qualities of the alcohol-denatured protein concentrates and the like; however, the higher the temperature (but below the boiling point of the alcoholic aqueous solution), the higher the degree of purification, but the application of too high a washing temperature may decrease the solubility of the proteins.

Generally, the washing may be carried out by placing the defatted soybean in a vessel together with the alcoholic aqueous solution and stirring the mixture. This washing step transfers saccharides, pigment ingredients and odor causing ingredients contained in the defatted soybean to the alcoholic aqueous solution. The mixture is then filtered to produce a filtrate and a caked residue. If necessary, the cake may be washed repeatedly with the alcoholic aqueous solution to produce a higher degree of purification.

The resulting cake is then subjected to drying under reduced pressure or drying under heating to remove the remaining alcohol and moisture and to provide alcohol-denatured, water-insoluble soybean protein concentrates.

A neutral to slightly alkaline aqueous dispersion in which the soybean protein concentrates are dispersed is then prepared from the soybean protein concentrates. This aqueous dispersion may be preferably obtained by dispersing the above-mentioned concentrates in water and adjusting it with ammonia to achieve a neutral to slightly alkaline dispersion. The aqueous dispersion may also be prepared by dispersing the above-mentioned concentrates in an aqueous solution which was preadjusted with ammonia to a desired pH so as to give a neutral to slightly alkaline aqueous dispersion. The aqueous dispersion is then added with a neutral protease. The protease is gradually stirred in to act on the proteins and carry out enzymatic hydrolyzation.

The adjustment of the aqueous dispersion to a neutral to slightly alkaline pH range is conducted so that the proteins will be readily decomposed by the action of the neutral protease. Accordingly, the optimum pH is preferably adjusted so as to make the individual neutral protease used most effective with the protein.

Furthermore, the adjustment of the pH range with ammonia, as in the practice of the present invention, is preferred because the ammonia is volatilized without leaving undesirable salts and the protein purity of the products is not decreased.

The neutral protease may be any protease capable of acting in a neutral to slightly alkaline pH range (pH 7 to pH 9) and may include, for example, papain, bromelain, ficin, trypsin, chymotrypsin, cathepsin, or the like; papain being preferable.

Although it is also possible to use alkaline protease on the above-mentioned dispersion after it has been adjusted to alkaline, this is not preferable because the flavor and color tone of the products are lessened.

The rate of the enzymatic decomposition reaction depends on the manufacturing conditions of the soybean protein concentrates, the concentrations of these concentrates in the aqueous dispersion (generally, from 5 to 15 percent by weight, preferably from 8 to 12 percent by weight) and the pH thereof, the kind and titer of the enzyme and the amount thereof with respect to the raw material concentrates (generally, from 0.05 percent by weight to 1.0 percent by weight, and preferably from 0.1 to 0.5 percent by weight), the temperatures of decomposition (the optimum temperature of the enzyme to be used being preferred) and other conditions. In any case, it is desired to terminate the enzymatic decomposition reaction at a time not to produce bitterness in the aqueous dispersion.

The degree of advancement of the above-mentioned enzymatic decomposition reaction may be monitored by a soluble rate of protein with trichloroacetic acid (TCA soluble rate). It is preferable to terminate the reaction in the range of approximately 20 to 30 percent of the TCA soluble rate, thereby avoiding bitterness in the products and extracting the proteins to the maximum extent of approximately 80 percent. Where the TCA soluble rate is below 20 percent, the extraction rate of proteins becomes low; but the application of such a TCA soluble rate may be adaptable to the present invention. When the TCA soluble rate is over 30 percent, it is undesirable because a bitter taste will often be produced. Similarly, even if the TCA rate were above this value, the conditions may be applicable within the range in which a bitter taste can be permitted or allowed.

The enzymatic decomposition reaction is ceased by deactivating the enzyme by heating. It is preferred that the heating be conducted by means of a plate type heat exchanger at high temperatures for a short period of time (at 90° C. to 120° C. for a period between 20 seconds and 20 minutes).

The reaction mixture thus prepared is then filtered to obtain a filtrate which is in turn concentrated. The resulting concentrates are spray dried to collect the soybean protein products. Since the ammonia remaining in the concentrates is volatilized thoroughly during this drying step, the soybean protein products maintain their pH at substantially 7.0.

The present invention is practiced in the manner described above and provides soybean proteins which have high solubility, and excellent flavor and color tone. The soybean proteins thus produced may be utilized in various foods.

The present invention does not require the step of acid precipitation which is required in conventional processes for producing isolated soybean proteins. Furthermore, the present invention can produce soybean proteins having substantially the same protein purity as the isolated soybean proteins when the manufacturing conditions are suitably selected.

The following examples will explain the present invention in more detail, but should not be construed as limiting the invention thereto.

EXAMPLE 1

Twenty kilograms of low denatured defatted soybean was washed with 200 kg of a 60 w/w% aqueous ethanol solution in a closed tank at 50° C. for 30 minutes and then filtered to give 32 kg of caked residue. The caked residue was then transferred to a drier under a reduced pressure and dried at 70° C. to provide 13.5 kg of soybean protein concentrates. An analysis of the concentrates showed 6.5% moisture, 67% protein (detected as anhydride) and a nitrogen solubility index (NSI) of 11. The whole concentrate amount was mixed with 150 liters of warm water (60° C.) in a jacketed tank and dispersed by stirring. A small portion of this solution was sampled as Sample A.

To this solution was added aqueous ammonia to adjust the pH to 9.0, then the solution was heated to 55° C. and maintained at this temperature (Sample B).

To this pH-adjusted solution was added 50 grams of "BIOPRASE" (20,000 U) (Trademark of Nagase Sangyo K.K.) and a reaction was carried out at 55° C. for 2 hours so that the pH value was decreased gradually to pH 7.5 (Sample C).

Heating and cooling was then effected by means of a plate type heat exchanger. The highest temperature of the solution was 120° C. (Sample D).

This dispersion was centrifuged and decanted to produce 120 liters of a solution having a solid content of 7.3%, the solution was then concentrated and spray-dried to give 8.0 kg of soybean proteins. The proteins had no soybean odor, and had a bright white color and high solubility in water. Analysis showed 7.0% moisture, 83.5% proteins (D/B) and an NSI of 95.

Samples A, B, C and D were each subjected to separation in a compact size centrifuge for laboratory use, and the resultant supernatants were measured for solids. The results are shown in Table 1.

TABLE 1

|  | Sample A | Sample B | Sample C | Sample D |
|---|---|---|---|---|
| Concentration of Solids | 2.7% | 4.0% | 7.0% | 7.3% |

As shown in the above table, it has been found that the concentration of solids in the supernatants increases with each step: dispersion in a weakly ammoniacal alkali solution, enzymatic decomposition and heat treatment. Further the solubility of the proteins was increased.

EXAMPLE 2

The procedure of Example 1 was followed to provide 13.5 kg of concentrated soybean proteins. Two 1 kg portions of the concentrates were separately dispersed in 10 liters of water. One disperion was adjusted with aqueous ammonia to pH 8.0 (Sample E) and the other with a sodium hydroxide aqueous solution to pH 8.0 (Sample F). To each of the dispersions was added 3 grams of papain (Japanese Pharmacopoeia), and the mixtures were subjected to enzymatic decomposition at 55° C. for 3 hours. Both of the dispersions were adjusted with aqueous ammonia and a sodium hydroxide aqueous solution over this period of time to maintain their pH values at 8.0. After completion of the reaction, hydrochloric acid was added to adjust the pH to 7.0, and a heating treatment was conducted in a water bath at 90° C. for 20 minutes. The dispersions were spray-dried to produce soybean proteins. The products from these dispersions were labled Sample E and Sample F, respectively. Table 2 shows their compositions.

TABLE 2

|  | Sample E | Sample F |
| --- | --- | --- |
| Moisture | 5% | 5% |
| Protein (detected as anhydride) | 82.3% | 78.0% |
| Ash | 6.0% | 9.8% |

It was found that Sample E, with an ammonia-adjusted pH value, had a smaller ash content and a higher protein purity than the Sample F adjusted with sodium hydroxide. In both cases, the flavor of the proteins was favorable.

EXAMPLE 3

Five kilograms of defatted soybean was washed with a 75 w/w% aqueous ethanol solution in a ratio of solvents of 10 w/w% at 55° C. and then filtered. This procedure was performed twice to produce, after drying at room temperature, 3.4 kg of soybean protein concentrates. It had a moisture content of 8.0%, a crude protein (D/B) content of 69.8% and an NSI of 14.

Three 1 kg portions of the soybean protein concentrates were separately dispersed in 10 liters of water and adjusted with aqueous ammonia to pH 7.5. The dispersions were then heated to 45° C. and maintained at this temperature. To each of them was added 3 grams of papain (Japanese Pharmacopoeia) to subject the dispersion to enzymatic decomposition for 30 minutes (Sample G), for 2 hours (Sample H), and for 5 hours (Sample I). After being heated at 95° C. for 20 minutes, each of the dispersions was centrifuged to separate out the soybean proteins which were then spray-dried to three kinds of purified soybean proteins. They were measured for flavor, moisture content, crude protein (D/B) and the like. The results are shown in Table 3.

TABLE 3

|  | Yield (g) | Flavor | Moisture | Crude Protein (D/B) | TCA soluble rate of Decomposed Dispersion |
| --- | --- | --- | --- | --- | --- |
| Sample G | 300 | Good | 6.5% | 75.2% | 10% |
| Sample H | 500 | Good | 6.5% | 82.0% | 25% |
| Sample I | 600 | Bitter taste | 6.5% | 84.5% | 41% |

It may be seen from Table 3 that, when the TCA soluble rate was 10%, the product yield was somewhat low, while when the TCA soluble rate was 41%, a bitter taste was produced.

What we claim is:

1. A process for manufacturing soybean proteins comprising the steps of:
    providing an aqueous dispersion of alcohol-denatured soybean protein concentrates obtained by washing defatted soybean with an alcoholic aqueous solution and adjusting the pH with ammonia to within a neutral to slightly alkaline range;
    solubilizing the soybean proteins by the reaction of a neutral protease on said soybean proteins in said dispersion, said solubilizing proceeding to a level short of the onset of a bitter taste in said dispersion;
    removing insolubles from said dispersion to produce an aqueous solution containing said solubilized proteins; and
    recovering said solubilized proteins by spray drying said aqueous solution.

2. A process according to claim 1, wherein the alcoholic aqueous solution contains alcohol in an amount between approximately 50 and approximately 80 percent by weight.

3. A process according to claim 1, wherein the amount of the alcoholic aqueous solution is from 5 to 20 times the weight of the defatted soybean.

4. A process according to claim 1, wherein the washing with the alcoholic aqueous solution is conducted at a temperature below the boiling point thereof.

5. A process according to claim 1, wherein the reaction of the neutral protease on said proteins is terminated before a bitter taste is produced in the dispersion.

6. A process according to claim 1, wherein the action of the neutral protease is continued until the soluble rate of soybean proteins as measured with trichloroacetic acid falls within the range of approximately 20 to approximately 30 percent.

7. A process according to claim 6, wherein the neutral protease is papain.

8. A process according to claim 5 or 6, comprising terminating the action of the neutral protease by heating.

9. A process for manufacturing soybean proteins comprising the steps of:
    providing an aqueous dispersion of alcohol-denatured soybean protein concentrates obtained by washing defatted soybean with an alcoholic aqueous solution and adjusting the pH with ammonia to within a neutral to slightly alkaline range;
    solubilizing the soybean proteins by the reaction of a neutral protease on said soybean proteins in said dispersion, wherein the reaction with the neutral protease is continued until the soluble rate of soybean proteins as measured with trichloroacetic acid falls within the range of approximately 20 to approximately 30 percent, and wherein the reaction of the neutral protease is terminated by heating;
    removing insolubles from said dispersion to produce an aqueous solution containing said solubilized proteins; and,
    recovering said solubilized proteins by spray drying said aqueous solution.

10. A process according to claim 9, wherein the alcoholic aqueous solution contains alcohol in an amount between approximately 50 and approximately 80 percent by weight.

11. A process according to claim 9, wherein the amount of the alcoholic aqueous solution is from 5 to 20 times the weight of the defatted soybean.

12. A process according to claim 9, wherein the washing with the alcoholic aqueous solution is conducted at a temperature below the boiling point thereof.

* * * * *